United States Patent
Chen

(10) Patent No.: US 10,564,346 B2
(45) Date of Patent: Feb. 18, 2020

(54) BACKLIGHT MODULE AND DISPLAY DEVICE

(71) Applicants: AU Optronics (Suzhou) Corp., Ltd, Suzhou (CN); AU Optronics Corporation, Hsin-Chu (TW)

(72) Inventor: Lu Chen, Suzhou (CN)

(73) Assignees: AU OPTRONICS (SUZHOU) CORP., LTD., Suzhou (CN); AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 16/165,000

(22) Filed: Oct. 19, 2018

(65) Prior Publication Data

US 2019/0121019 A1 Apr. 25, 2019

(30) Foreign Application Priority Data

Oct. 20, 2017 (CN) .......................... 2017 1 0985338

(51) Int. Cl.
*F21V 8/00* (2006.01)

(52) U.S. Cl.
CPC ......... *G02B 6/0088* (2013.01); *G02B 6/0051* (2013.01); *G02B 6/0053* (2013.01); *G02B 6/0061* (2013.01)

(58) Field of Classification Search
CPC .. G02B 6/0088; G02B 6/0051; G02B 6/0053; G02B 6/0061; F21V 2200/20; F21V 13/02; F21V 5/08; F21V 5/00; F21S 8/00
See application file for complete search history.

(56) References Cited

U.S. PATENT DOCUMENTS

| 6,175,396 | B1* | 1/2001 | Kim | G02F 1/133308 |
| | | | | 349/58 |
| 2002/0080298 | A1* | 6/2002 | Fukayama | G02F 1/133308 |
| | | | | 349/58 |
| 2006/0007367 | A1* | 1/2006 | Cho | G02F 1/133308 |
| | | | | 349/58 |

(Continued)

FOREIGN PATENT DOCUMENTS

| CN | 203052433 U | 7/2013 |
| CN | 203595046 U | 5/2014 |

(Continued)

OTHER PUBLICATIONS

Office Action issued by (TIPO) Intellectual Property Office Ministry of Economic Affairs R.O.C. dated Mar. 29, 2019 for Application No. 107119525, Tawian.

(Continued)

*Primary Examiner* — Bao Q Truong
*Assistant Examiner* — Glenn D Zimmerman
(74) *Attorney, Agent, or Firm* — Tim Tingkang Xia, Esq.; Locke Lord LLP

(57) ABSTRACT

A backlight module includes a frame, a light guide plate, and at least one first optical film. The frame has a supporting surface. The light guide plate is disposed in the frame. The first optical film is disposed above the light guide plate. The first optical film has a first body and a first ear extending from the first body. The first ear is supported by the supporting surface. A first boundary line exists between the first body and the first ear. The first optical film includes an opening region crossing the first boundary line. The opening region has at least one opening.

11 Claims, 9 Drawing Sheets

(56) References Cited

U.S. PATENT DOCUMENTS

| | | | | |
|---|---|---|---|---|
| 2010/0079699 A1* | 4/2010 | Cho | ............ | G02F 1/133608 |
| | | | | 349/61 |
| 2010/0328927 A1* | 12/2010 | Huang | ............ | G02F 1/133606 |
| | | | | 362/97.1 |
| 2014/0301104 A1* | 10/2014 | Lan | ............ | G02B 6/0088 |
| | | | | 362/607 |
| 2017/0163778 A1* | 6/2017 | Noma | ............ | H04M 1/00 |

FOREIGN PATENT DOCUMENTS

| | | |
|---|---|---|
| CN | 204069051 U | 12/2014 |
| CN | 206209241 U | 5/2017 |
| CN | 106932965 A | 7/2017 |
| JP | 2008-198540 A | 8/2008 |
| TW | 449048 U | 8/2001 |

OTHER PUBLICATIONS

Office Action issued by the State Intellectual Property Office of the Peoples Republic of China dated May 27, 2019 for Application No. CN201710985338.0.

* cited by examiner

BACKLIGHT MODULE AND DISPLAY DEVICE

CROSS-REFERENCE TO RELATED PATENT APPLICATION

This non-provisional application claims priority to and the benefit of, pursuant to 35 U.S.C. § 119(a), patent application Serial No. 201710985338.0 filed in China on Oct. 20, 2017. The disclosure of the above application is incorporated herein in its entirety by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference were individually incorporated by reference.

FIELD

The present invention relates to a backlight module and a display device.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Flat display devices have become a mainstream among different types of display devices. For example, all of the home televisions, monitors of personal computers and laptop computers, mobile computers, and digital cameras are products that widely use flat display devices. At present, a conventional display device mainly includes a backlight module that generates backlight and a display panel that receives the backlight and generates an image.

In a conventional backlight module, an ear protruding from an edge of an optical film is usually designed so that the optical film can be placed on a frame. However, because there is no light guide plate below the ear to provide a light source, the ear is likely to be relatively dim.

To improve this situation, conventionally, a microstructure is disposed at the bottom of the light guide plate, to change the light traveling direction to increase the luminance at the ear. However, such a method is likely to cause a problem of the ear being excessively bright.

SUMMARY

In view of this, an objective of the present invention is to provide a backlight module and a display device that are capable of resolving the foregoing problems.

To achieve the foregoing objective, a backlight module is provided according to an implementation of the present invention, including a frame, a light guide plate, and at least one first optical film. The frame has a supporting surface. The light guide plate is disposed in the frame. The at least one first optical film is disposed above the light guide plate, where the first optical film has a first body and a first ear extending from the first body, the first ear is supported by the supporting surface, a first boundary line exists between the first body and the first ear, the first optical film includes an opening region crossing the first boundary line, and the opening region has at least one opening.

In one or more implementations of the present invention, the first ear has a positioning hole, the positioning hole has a positioning hole boundary near the first boundary line, the opening region has an outer boundary on a side near the first ear, and the distance from the outer boundary to the first boundary line is less than the distance from the positioning hole boundary to the first boundary line.

In one or more implementations of the present invention, the length of the opening region in an extending direction of the first boundary line is less than or equal to 80% of the length of the first ear in the extending direction of the first boundary line.

In one or more implementations of the present invention, the backlight module further includes: at least one second optical film, where the second optical film and the first optical film are laminated, the second optical film has a second body and a second ear extending from the second body, the second ear is supported by the supporting surface, a second boundary line exists between the second body and the second ear, the second optical film does not have an opening region crossing the second boundary line, the first optical film is a diffusion film, and the second optical film includes a brightness enhancement film.

In one or more implementations of the present invention, the backlight module further includes: at least one second optical film, where the second optical film and the first optical film are laminated, the second optical film has a second body and a second ear extending from the second body, the second ear is supported by the supporting surface, a second boundary line exists between the second body and the second ear, the second optical film does not have an opening region crossing the second boundary line, the first optical film is a brightness enhancement film, and the second optical film includes a diffusion film.

In one or more implementations of the present invention, the area of the opening is equal to the area of the opening region.

In one or more implementations of the present invention, the at least one opening crosses the first boundary line.

In one or more implementations of the present invention, the number of the at least one opening is plural, and the areas of the openings gradually decrease along a direction from the first boundary line to the first ear, or the areas of the openings gradually decrease along a direction from the first boundary line to the first body.

In one or more implementations of the present invention, the shape of the at least one opening is one of or a combination of a polygon, a circle, an ellipse, a cross, or an irregular shape.

In one or more implementations of the present invention, a gap exists between the frame and the light guide plate, and the first boundary line corresponds to the gap.

A display device is provided according to another implementation of the present invention, including the backlight module described above and a display panel. The display panel is disposed on the backlight module.

In one or more implementations of the present invention, the display device further includes an outer frame. The outer frame has an accommodating space, where the backlight module and the display panel are disposed in the accommodating space, the outer frame has a side wall, and an outer surface of the side wall defines a side edge of the display device. The display panel includes a display area and a non-display area located outside the display area, and the display panel has a light-shielding layer located in the non-display area. The opening region has an inner boundary on a side near the first body, and the distance e from the inner boundary to the first boundary line meets e≤a−b−d. a is the distance from an edge of the light-shielding layer near the display area to the side edge of the display device. b is the distance from the first optical film to the light-shielding layer. d is the distance from the first boundary line to the side edge of the display device.

Based on the above, for the backlight module in the present invention, the opening is provided in the opening region of the first optical film crossing the first boundary line, and therefore, the luminance can be adjusted at the first ear of the first optical film, so that the luminance of the backlight module at an ear near the frame can be adjusted.

These and other aspects of the present disclosure will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment, and wherein.

DETAILED DESCRIPTION

Figure 1A:
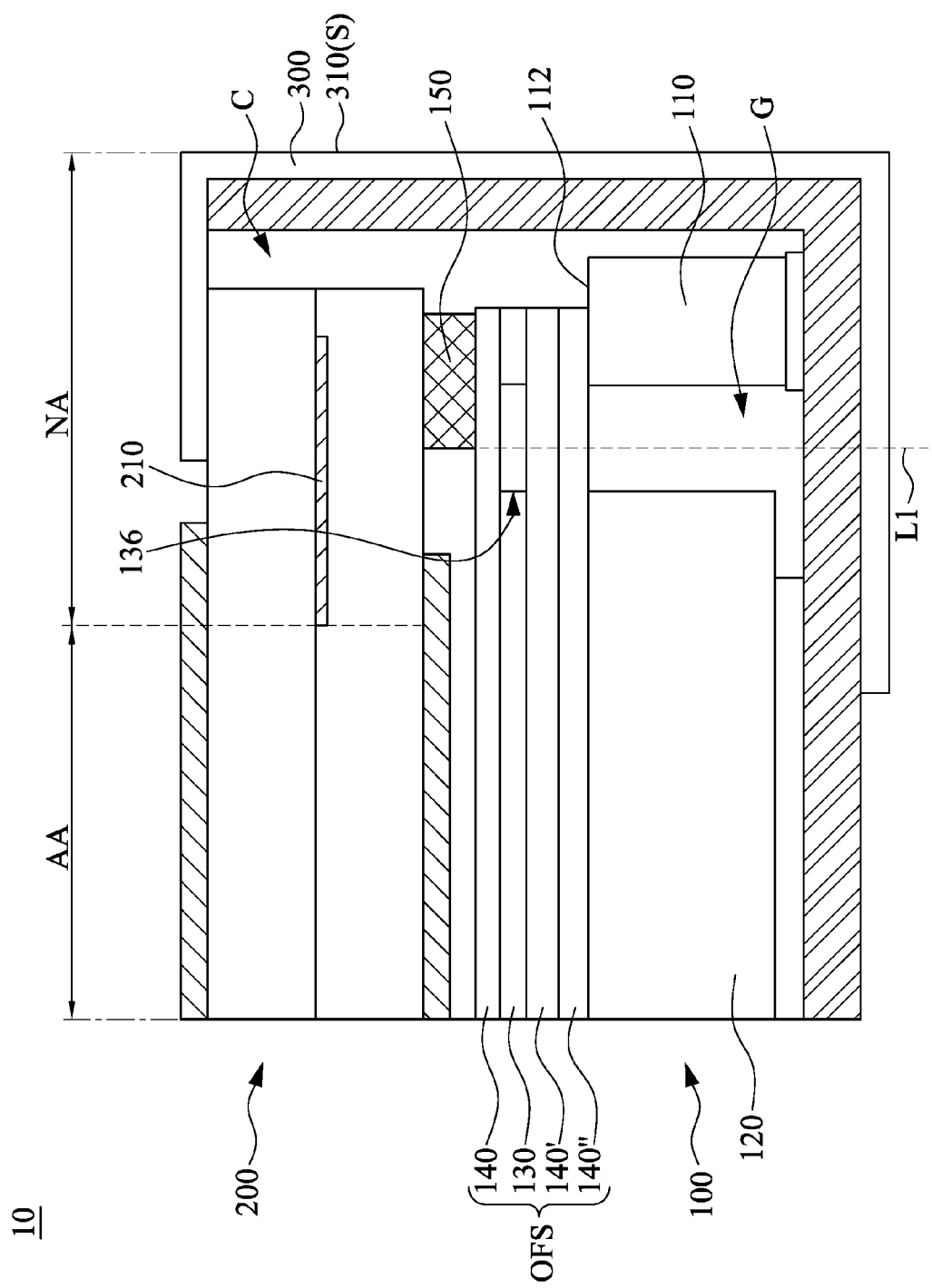
FIG. 1A and FIG. 1B are respectively a partial side view of a display device and a schematic diagram of a relationship between elements according to an implementation of the present invention.

A plurality of implementations of the present invention is disclosed with reference to the drawings below, and for clear description, many practical details are described in the following descriptions. However, it should be understood that, the practical details should not be intended to limit the present invention. That is, in some implementations of the present invention, the practical details are not necessary. In addition, to simplify the drawings, some conventional and commonly-used structures and elements are simply and schematically shown in the drawings.

Figure 1B:
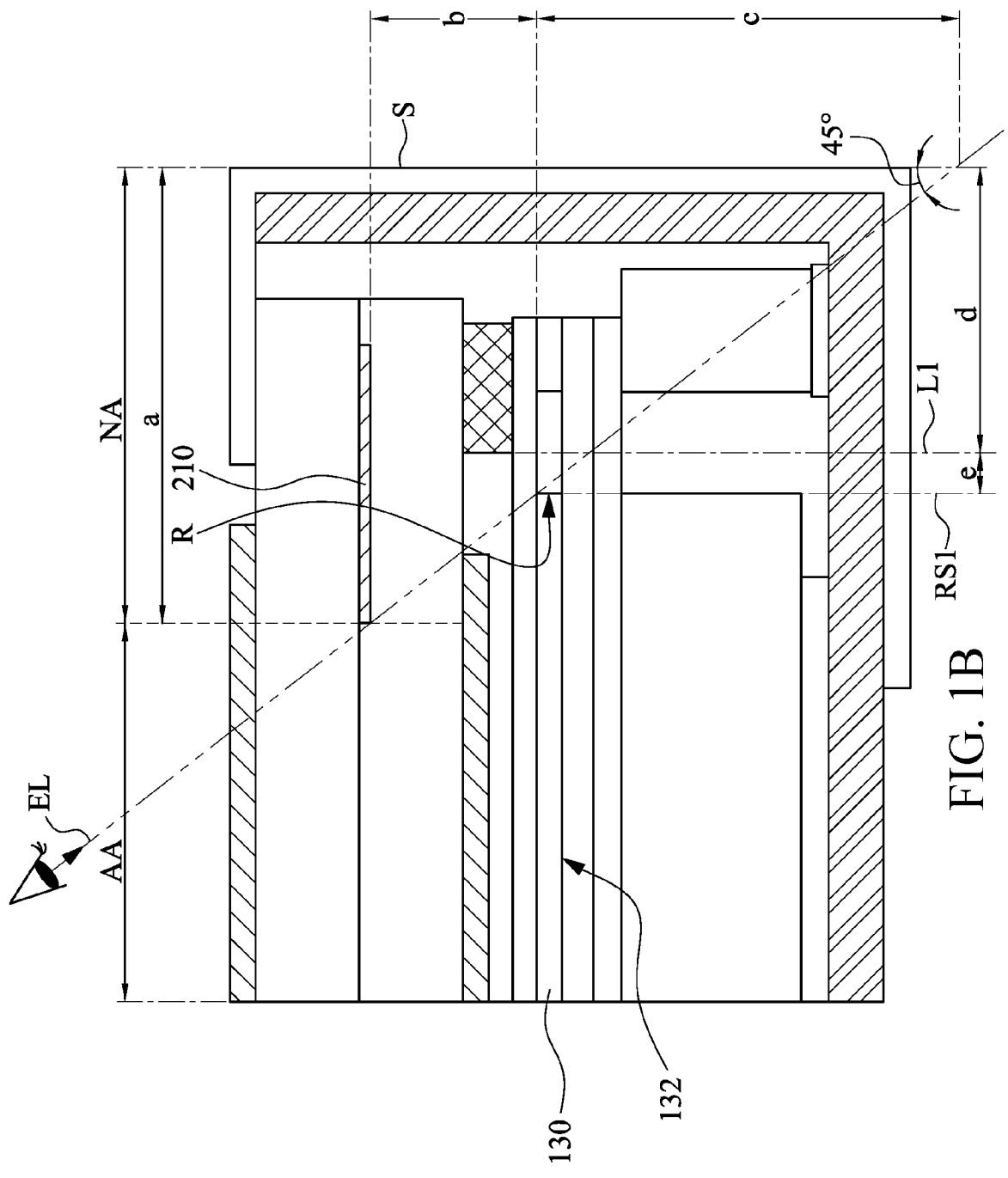
Figure 1C:
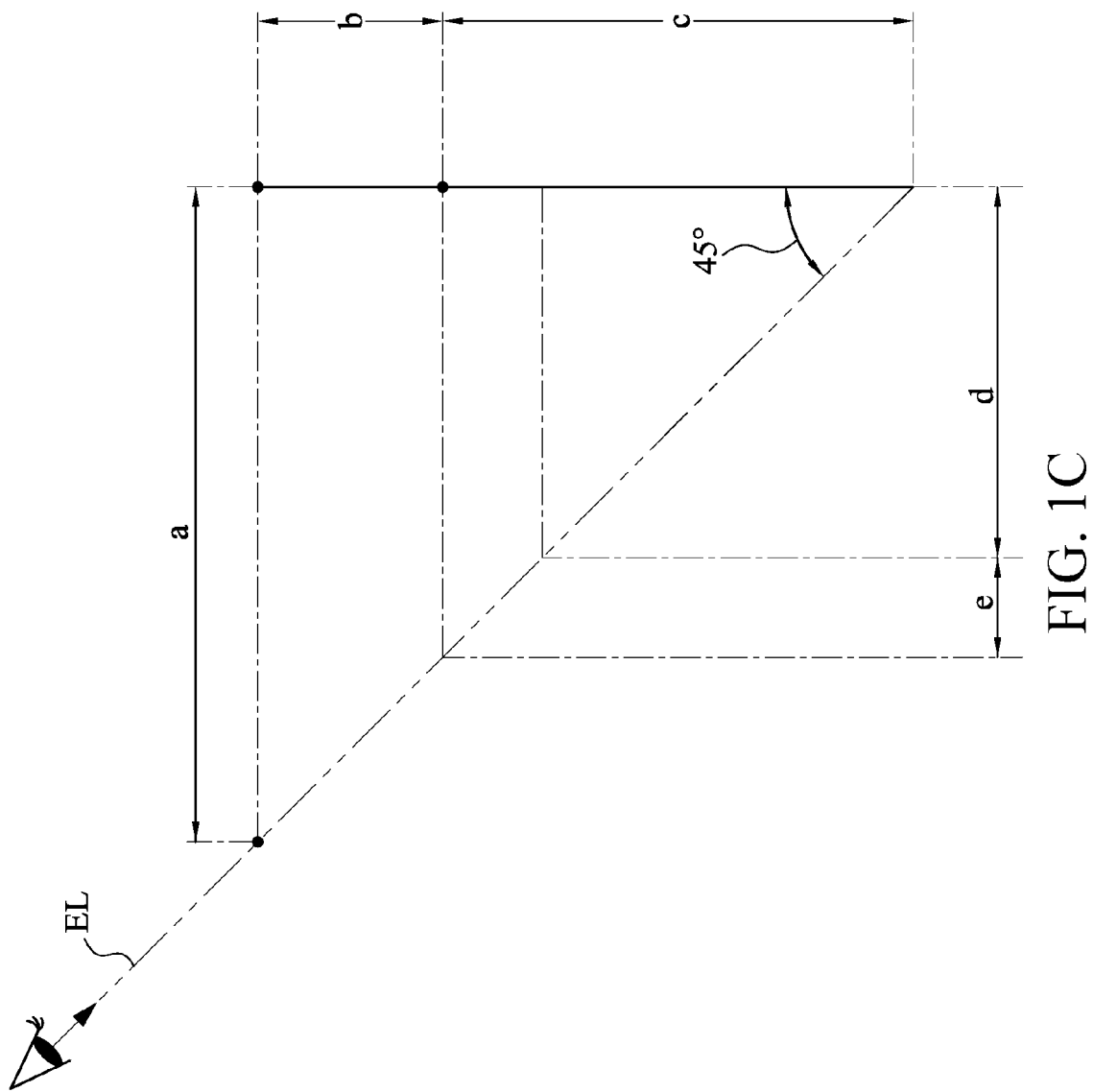
FIG. 1C shows a scaling relationship between elements in FIG. 1B.
Figure 2:
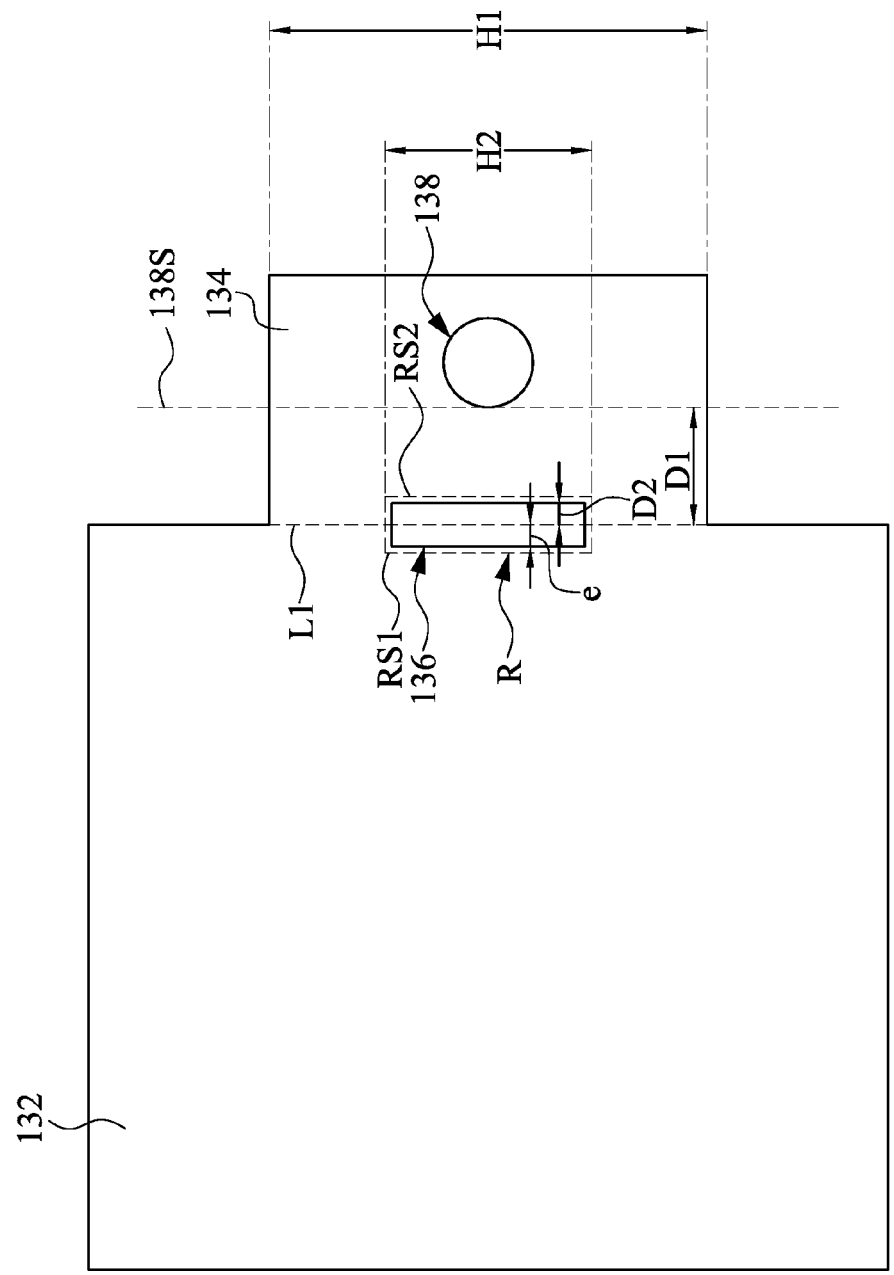
FIG. 2 is a top view of a first optical film in FIG. 1A.

FIG. 1A and FIG. 1B are respectively a partial side view of a display device 10 and a schematic diagram of a relationship between elements according to an implementation of the present invention. FIG. 1C shows a scaling relationship between elements in FIG. 1B. FIG. 2 is a top view of a first optical film 130 in FIG. 1A. First, as shown in FIG. 1A and FIG. 2, in this implementation, the display device 10 includes a backlight module 100 and a display panel 200, and the display panel 200 is disposed on the backlight module 100. The backlight module 100 includes a frame 110, a light guide plate 120, and an optical film set OFS. The frame 110 has a supporting surface 112, and the light guide plate 120 is disposed in the frame 110. The optical film set OFS includes at least one first optical film 130, and the first optical film 130 is disposed above the light guide plate 120. The first optical film 130 has a first body 132 and a first ear 134 extending from the first body 132, and the first ear 134 is supported by the supporting surface 112. A first boundary line L1 exists between the first body 132 and the first ear 134, the first optical film 130 includes an opening region R crossing the first boundary line L1, and the opening region R has at least one opening 136. A gap G exists between the frame 110 and the light guide plate 120, and the first boundary line L1 corresponds to the gap G. In some implementations, the first optical film 130 may be, for example, a diffusion film or a brightness enhancement film.

In this case, the opening 136 is provided in the opening region R of the first optical film 130 crossing the first boundary line L1, so that the luminance can be adjusted at the first ear 134 of the first optical film 130, and the luminance of the backlight module 100 at an ear near the frame 110 can be adjusted.

Specifically, because the diffusion film has a function of light scattering, the luminance decreases when the light generated by a light source (not shown) of the backlight module 100 penetrates through the diffusion film. In an implementation, the first optical film 130 is a diffusion film. When the luminance at the ear is relatively dim, the opening 136 is provided in the opening region R of the diffusion film crossing the first boundary line L1, so that the luminance of the backlight module 100 at the ear near the frame 110 can be increased.

It should be noted that, the optical film set OFS may include multiple diffusion films. However, not each diffusion film is necessarily provided with the opening 136 in the opening region R crossing the first boundary line L1. When a luminance difference that needs to be adjusted is relatively small, the opening 136 may be provided in only one of the multiple diffusion films. When a luminance difference that needs to be adjusted is relatively large, the opening 136 may be provided in multiple diffusion films. That is, the number of the diffusion films that serves as the first optical film 130 may be flexibly adjusted according to an actual luminance difference.

On the other hand, because a brightness enhancement film has a function of light concentration and brightness enhancement, the luminance increases when the light generated by a light source (not shown) of the backlight module 100 penetrates through the brightness enhancement film. The brightness enhancement film is, for example, a prism sheet, a brightness enhancement sheet, a quantum dot brightness enhancement sheet, or a reflective polarizing brightness enhancement sheet. In another implementation, the first optical film 130 is a brightness enhancement film. When the luminance at the ear is relatively bright, the opening 136 is provided in the opening region R of the brightness enhancement film crossing the first boundary line L1, so that the luminance at the ear of the backlight module 100 near the frame 110 can be decreased.

It should be noted that, the optical film set OFS may include multiple brightness enhancement films. However, the opening 136 does not need to be provided in the opening region R crossing the first boundary line L1 for each brightness enhancement film. When a luminance difference that needs to be adjusted is relatively small, the opening 136 may be provided in only one of the multiple brightness enhancement films. When a luminance difference that needs to be adjusted is relatively large, the opening 136 may be provided in the multiple brightness enhancement films. That is, the number of the brightness enhancement films that serves as the first optical film 130 may be flexibly adjusted according to an actual luminance difference.

Figure 3:
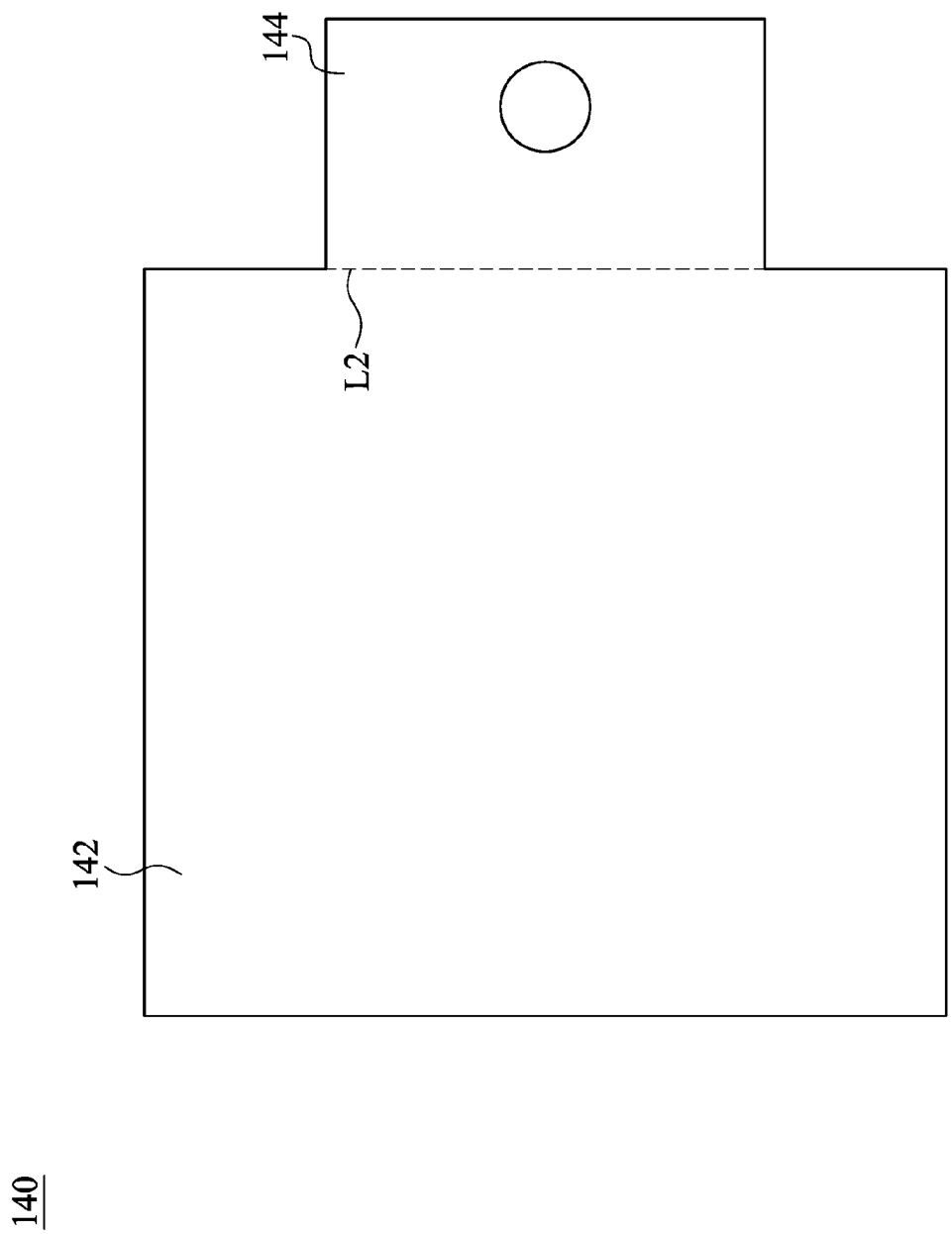
FIG. 3 is a top view of a second optical film in FIG. 1A.

FIG. 3 is a top view of a second optical film 140 in FIG. 1A. As shown in FIG. 1A and FIG. 3, in some implementations, the backlight module 100 further includes at least one second optical film 140. The second optical film 140 and the first optical film 130 are laminated. The second optical film 140 has a second body 142 and a second ear 144 extending from the second body 142. The second ear 144 is supported by the supporting surface 112. A second boundary line L2 exists between the second body 142 and the second ear 144, and the second optical film 140 does not have an opening region crossing the second boundary line L2. In some implementations, the second optical film 140 includes, for example, a diffusion film or a brightness enhancement film.

As mentioned above, the optical film set OFS may include multiple diffusion films and multiple brightness enhancement films. When at least one of the multiple diffusion films is selected as the first optical film 130 that has the opening 136, the remaining optical films (for example, diffusion films or brightness enhancement films) in the optical film set OFS not provided with the opening 136 serve as the second optical films 140. When all of the diffusion films in the optical film set OFS are selected as the first optical films 130 that have the opening 136, the remaining optical films (for example, brightness enhancement films) in the optical film set OFS not provided with the opening 136 serve as the second optical films 140. That is, in some implementations, the first optical film 130 is a diffusion film, and the second optical film 140 includes a brightness enhancement film.

On the other hand, when at least one of the multiple brightness enhancement films is selected as the first optical film 130 that has the opening 136, the remaining optical films (for example, diffusion films or brightness enhancement films) in the optical film set OFS not provided with the opening 136 serve as the second optical films 140. When all of the brightness enhancement films in the optical film set OFS are selected as the first optical films 130 that have the opening 136, the remaining optical films (for example, diffusion films) in the optical film set OFS not provided with the opening 136 serve as the second optical films 140. That is, in some implementations, the first optical film 130 is a brightness enhancement film, and the second optical film 140 includes a diffusion film.

As can be learned from the foregoing descriptions, regardless of the relatively dim luminance or the relatively bright luminance at the ear, when the optical film set OFS has both the diffusion films and the brightness enhancement films, the opening 136 may be provided on at least some of the diffusion films or brightness enhancement films as required, so as to adjust the luminance.

It should be noted that, FIG. 1A shows that the first optical film 130 is disposed between the second optical film 140 and the second optical films 140' and 140'' and is merely a schematic diagram, but the present invention is not limited thereto. Persons of ordinary skill in the art can flexibly adjust a relative position of the first optical film 130 and the second optical film 140 according to an actual requirement provided that the first optical film 130 and the second optical film 140 are laminated. In addition, FIG. 1A shows only one first optical film 130 and is merely a schematic diagram, but the present invention is not limited thereto. Persons of ordinary skill in the art can flexibly adjust the number of the first optical films 130 and the second optical films 140 according to an actual requirement.

Further, refer to FIG. 1A. In some implementations, the display device 10 further includes an outer frame 300. The outer frame 300 has an accommodating space C, and the backlight module 100 and the display panel 200 are disposed in the accommodating space C. The outer frame 300 has a side wall 310, and an outer surface of the side wall 310 defines a side edge S of the display device 10. The display panel 200 includes a display area AA and a non-display area NA located outside the display area AA, the display panel 200 has a light-shielding layer 210 located in the non-display area NA.

Refer to FIG. 1B and FIG. 2. In this implementation, the opening region R has an inner boundary RS1 on a side near the first body 132. The inner boundary RS1 is at a position of the opening region R, on a side near the first body 132 and most distant from the first boundary line L1. The distance e from the inner boundary RS1 to the first boundary line L1 meets e≤a−b−d. Wherein a is the distance from an edge of the light-shielding layer 210 near the display area AA to the side edge S of the display device 10, b is the distance from the first optical film 130 to the light-shielding layer 210, and d is the distance from the first boundary line L1 to the side edge S of the display device 10.

Specifically, because the opening 136 is provided in the opening region R, when a user views the display device 10 at a 45-degree viewing angle, to avoid a poor display effect when the opening 136 in the opening region R falls on an extending line EL of the 45-degree viewing angle, the distance e from the inner boundary RS1 of the opening region R on the first body 132 to the first boundary line L1 needs to be limited in a particular range. In other words, the inner boundary RS1 cannot exceed an intersection of the extending line EL of the 45-degree viewing angle and the first optical film 130.

In this way, as shown in FIG. 1B and FIG. 1C, the angle between the extending line EL of the 45-degree viewing angle and the side edge S is 45 degree, so that the distance c from an intersection point of the extending line EL of the 45-degree viewing angle and an extending line of the side edge S, to the first optical film 130 equals a−b. In addition, c equals e+d, and therefore, e=c−d. In this way, a relation e=a−b−d can be obtained. As can be learned, to ensure that the inner boundary RS1 does not exceed the intersection of the extending line EL of the 45-degree viewing angle and the first optical film 130, e needs to meet the foregoing relation e≤a−b−d, to avoid a poor display effect when the opening 136 in the opening region R falls on the extending line EL of the 45-degree viewing angle.

Refer to FIG. 2 again. In some implementations, the first ear 134 has a positioning hole 138, and the positioning hole 138 has a positioning hole boundary 138S near the first boundary line L1. The opening region R has an outer boundary RS2 on a side near the first ear 134, distant from the first boundary line L1 and near the positioning hole 138. The distance D2 from the outer boundary RS2 to the first boundary line L1 is less than the distance D1 from the positioning hole boundary 138S to the first boundary line L1.

Further, refer to FIG. 2. In some implementations, the length H2 of the opening region R in an extending direction of the first boundary line L1 is less than or equal to 80% of the length H1 of the first ear 134 in the extending direction of the first boundary line L1, so as to keep the structure strength of the first ear 134 sufficient.

As shown in FIG. 2, in this implementation, the area of the opening 136 is equal to the area of the opening region R. By using such a design, when a luminance difference that needs to be adjusted is relatively large, the luminance can be relatively greatly adjusted.

In one or more implementations of the present invention, according to different luminance differences that need to be adjusted, design variations may be made on the opening 136 on the first optical film 130. This is described below with reference to FIG. 4 to FIG. 6.

Figure 4:
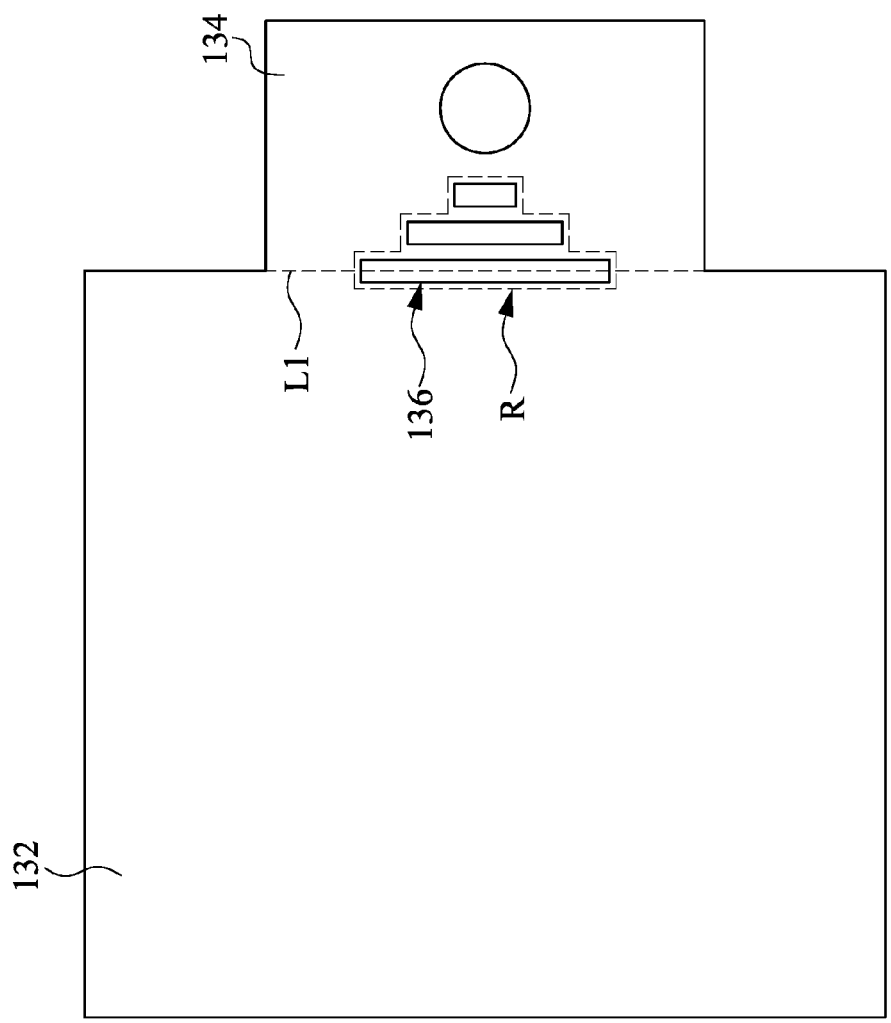
FIG. 4 is a top view of a first optical film according to another implementation of the present invention.

FIG. 4 is a top view of the first optical film 130 according to still another implementation of the present invention. As shown in FIG. 4, in this implementation, the number of openings 136 is plural, and the areas of the plurality of openings 136 gradually decrease along a direction from the first boundary line L1 to the first ear 134. That is, along the direction from the first boundary line L1 to the first ear 134, the areas of multiple openings 136 are designed to decrease gradually.

In addition, in some implementations, the sum of the areas of the plurality of openings 136 is less than or equal to 20% of the area of the opening region R. By using such a design, when a luminance difference that needs to be adjusted is relatively small, the luminance can be relatively slightly adjusted.

Figure 5:
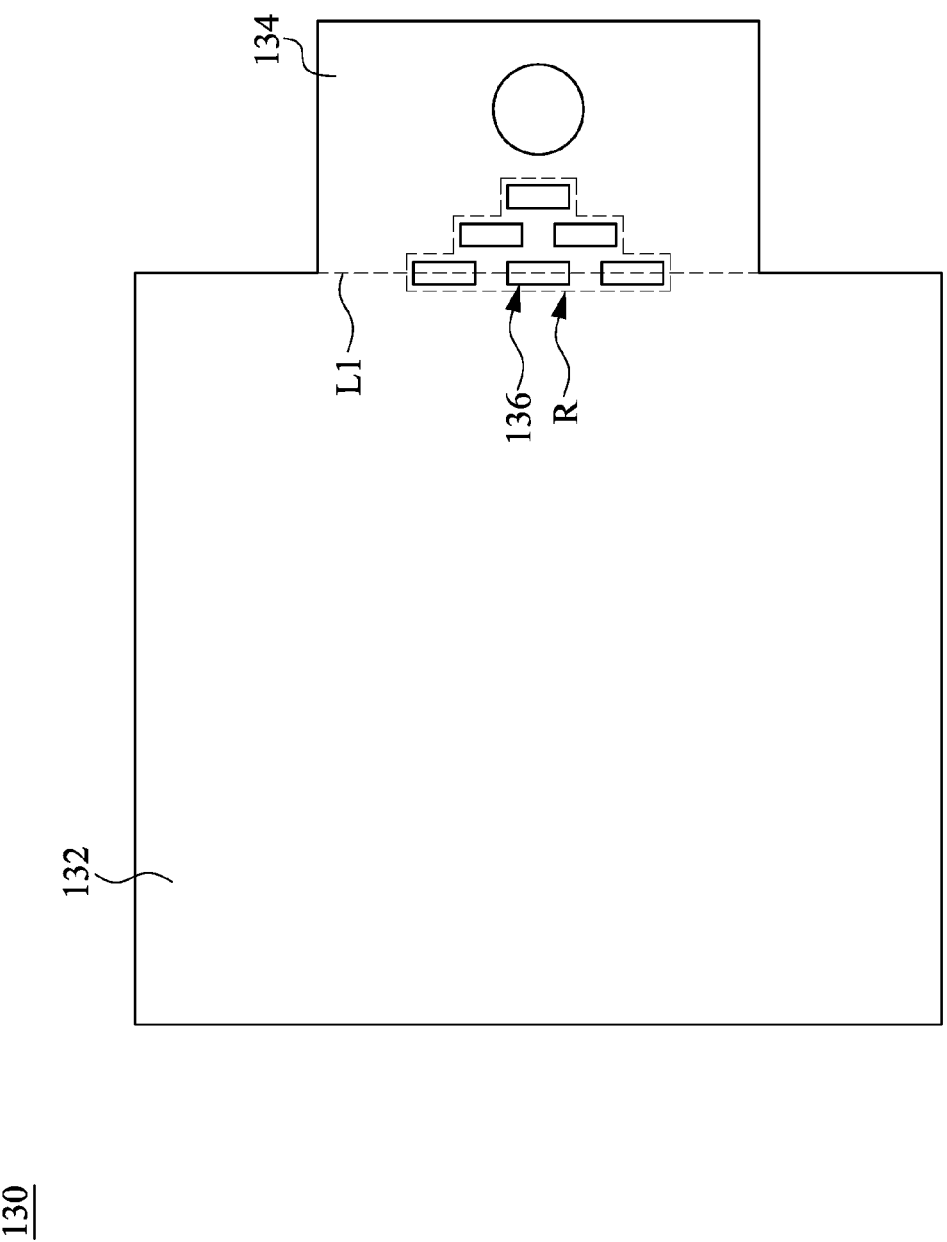
FIG. 5 is a top view of a first optical film according to still another implementation of the present invention.

FIG. 5 is a top view of the first optical film 130 according to still another implementation of the present invention. As shown in FIG. 5, in this implementation, there are at least three openings 136, and the distribution number of the openings 136 gradually decreases along a direction from the first boundary line L1 to the first ear 134. That is, along the direction from the first boundary line L1 to the first ear 134, the areas of multiple openings 136 are designed to decrease gradually.

Figure 6:
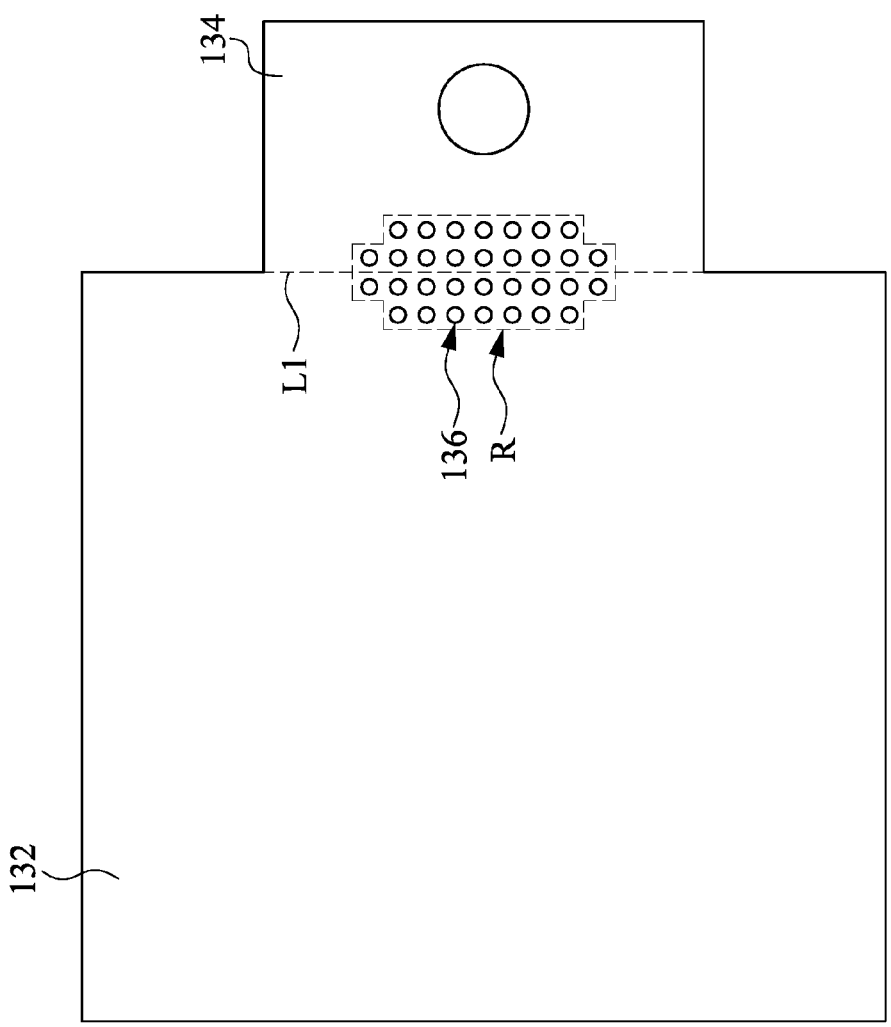
FIG. 6 is a top view of a first optical film according to still another implementation of the present invention.

It can be learned from FIG. 4 and FIG. 5 that, in some implementations, the opening region R has at least one opening 136 crossing the first boundary line L1, but the present invention is not limited thereto. In other implementations, the opening 136 in the opening region R may alternatively not cross the first boundary line L1. As shown in FIG. 6, multiple openings 136 are provided adjacent to the first boundary line L1, and along the direction from the first boundary line L1 to the first ear 134, the areas of multiple openings 136 are designed to decrease gradually. In addition, along a direction from the first boundary line L1 to the first body 132, the areas of the multiple openings 136 are also designed to decrease gradually. That is, a smaller distance from the first boundary line L1 indicates a larger total area of the openings, and a larger distance from the first boundary line L1 indicates a smaller total area of the openings.

Figure 7A:
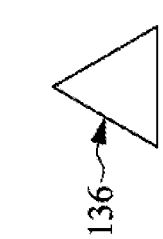
FIG. 7A to FIG. 7J are schematic diagrams of the shape of an opening according to different implementations of the present invention.
Figure 7B:
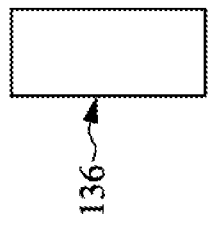
Figure 7C:
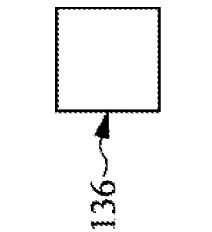
Figure 7D:
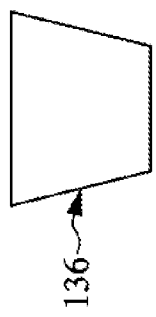
Figure 7E:
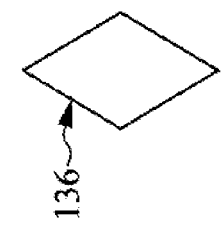
Figure 7F:
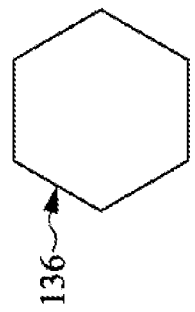
Figure 7G:
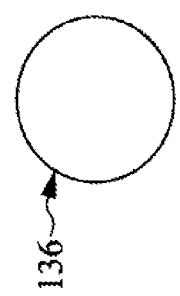
Figure 7H:
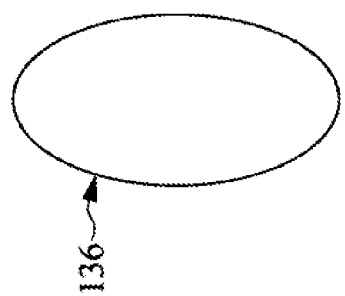
Figure 7I:
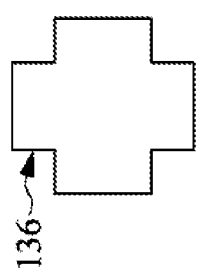
Figure 7J:
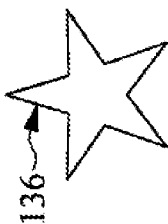

FIG. 7A to FIG. 7J are schematic diagrams of the shape of the opening 136 according to different implementations of the present invention. In some implementations, the shape of the opening 136 may be one of or a combination of a polygon, a circle, an ellipse, a cross, or an irregular shape. As shown in FIG. 7A, the shape of the opening 136 may be, for example, a triangle. As shown in FIG. 7B, the shape of the opening 136 may be, for example, a rectangle. As shown in FIG. 7C, the shape of the opening 136 may be, for example, a square. As shown in FIG. 7D, the shape of the opening 136 may be, for example, a trapezium. As shown in FIG. 7E, the shape of the opening 136 may be, for example, a rhombus. As shown in FIG. 7F, the shape of the opening 136 may be, for example, a hexagon. As shown in FIG. 7G, the shape of the opening 136 may be, for example, a circle. As shown in FIG. 7H, the shape of the opening 136 may be, for example, an ellipse. As shown in FIG. 7I, the shape of the opening 136 may be, for example, a cross. As shown in FIG. 7J, the shape of the opening 136 may be, for example, a star.

Refer to FIG. 1A again. In some implementations, the backlight module 100 further includes a tape 150. The tape 150 is used for fixing the ear of the optical film set OFS. The tape 150 may be, for example, a black tape or a white tape. In the present invention, a fixing manner of the ear of the optical film set OFS is not limited. In other implementations, a groove used for accommodating the ear of the optical film set OFS may further be provided at a position of the frame 110 corresponding to the ear, so that the ear of the optical film set OFS can be fixed in the frame 110, to improve the stability of the entire structure of the backlight module 100.

Based on the foregoing detailed descriptions of the specific implementations of the present invention, it can be clearly learned that, for the backlight module in the present invention, the opening is provided in the opening region of the first optical film crossing the first boundary line, and therefore, the luminance can be adjusted at the first ear of the first optical film, so that the luminance of the ear of the backlight module near the frame can be adjusted.

In conclusion, although the present disclosure is disclosed above with the embodiments, the embodiments are not intended to limit the present disclosure. A person of ordinary skill in the art to which the present disclosure belongs may make various modifications and polishing without departing from the spirit and scope of the present disclosure. Therefore, the protection scope of the present disclosure shall be subject to the protection scope of the claims.

What is claimed is:

1. A backlight module, comprising:
    a frame, having a supporting surface;
    a light guide plate, disposed in the frame; and
    at least one first optical film, disposed above the light guide plate, wherein the first optical film has a first body and a first ear extending from the first body, the first ear is supported by the supporting surface, a first boundary line exists between the first body and the first ear, the first optical film comprises an opening region crossing the first boundary line, and the opening region has at least one opening,
    wherein the first ear has a positioning hole not in communication with the at least one opening, the positioning hole has a positioning hole boundary near the first boundary line, the opening region has an outer boundary on a side near the first ear, and the distance from the outer boundary to the first boundary line is less than the distance from the positioning hole boundary to the first boundary line.

2. The backlight module according to claim 1, wherein the length of the opening region in an extending direction of the first boundary line is less than or equal to 80% of the length of the first ear in the extending direction of the first boundary line.

3. The backlight module according to claim 1, further comprising:
    at least one second optical film, wherein the second optical film and the first optical film are laminated, the second optical film has a second body and a second ear extending from the second body, the second ear is supported by the supporting surface, a second boundary line exists between the second body and the second ear, the second optical film does not have an opening region crossing the second boundary line, the first optical film is a diffusion film, and the second optical film comprises a brightness enhancement film.

4. The backlight module according to claim 1, further comprising:
at least one second optical film, wherein the second optical film and the first optical film are laminated, the second optical film has a second body and a second ear extending from the second body, the second ear is supported by the supporting surface, a second boundary line exists between the second body and the second ear, the second optical film does not have an opening region crossing the second boundary line, the first optical film is a brightness enhancement film, and the second optical film comprises a diffusion film.

5. The backlight module according to claim 1, wherein the area of the opening is equal to the area of the opening region.

6. The backlight module according to claim 1, wherein the at least one opening crosses the first boundary line.

7. The backlight module according to claim 1, wherein the number of the at least one opening is plural, and the areas of the openings gradually decrease along a direction from the first boundary line to the first ear, or the areas of the openings gradually decrease along a direction from the first boundary line to the first body.

8. The backlight module according to claim 1, wherein the shape of the at least one opening is one of or a combination of a polygon, a circle, an ellipse, a cross, or an irregular shape.

9. The backlight module according to claim 1, wherein a gap exists between the frame and the light guide plate, and the first boundary line corresponds to the gap.

10. A display device, comprising:
the backlight module according to claim 1; and
a display panel, disposed on the backlight module.

11. The display device according to claim 10, further comprising:
an outer frame, having an accommodating space, wherein the backlight module and the display panel are disposed in the accommodating space, the outer frame has a side wall, and an outer surface of the side wall defines a side edge of the display device;
the display panel comprises a display area and a non-display area located outside the display area, and the display panel has a light-shielding layer located in the non-display area;
the opening region has an inner boundary on a side near the first body, and the distance e from the inner boundary to the first boundary line meets $e \leq a-b-d$; wherein
a is the distance from an edge of the light-shielding layer near the display area to the side edge of the display device, b is the distance from the first optical film to the light-shielding layer, and d is the distance from the first boundary line to the side edge of the display device.

* * * * *